(12) United States Patent
Currier et al.

(10) Patent No.: US 12,104,648 B1
(45) Date of Patent: Oct. 1, 2024

(54) ANNULAR AND SHAFT OIL DISPENSERS

(71) Applicant: Zulu Pods, Inc., Davie, FL (US)

(72) Inventors: Todd M. Currier, Davie, FL (US);
Adam G. Smedresman, Davie, FL (US); Marios C. Soteriou, Davie, FL (US); Robert T. Sladen, Davie, FL (US)

( * ) Notice: Subject to any disclaimer, the term of this patent is extended or adjusted under 35 U.S.C. 154(b) by 0 days.

(21) Appl. No.: 17/887,421

(22) Filed: Aug. 13, 2022

Related U.S. Application Data

(63) Continuation-in-part of application No. 17/576,196, filed on Jan. 14, 2022, now Pat. No. 11,635,134.

(51) Int. Cl.
| | | |
|---|---|---|
| F02C 7/06 | (2006.01) | |
| F16C 19/16 | (2006.01) | |
| F16C 33/66 | (2006.01) | |

(52) U.S. Cl.
CPC .......... F16C 33/6681 (2013.01); F16C 19/16 (2013.01); *F16C 2300/02* (2013.01)

(58) Field of Classification Search
CPC ............................ F16C 33/6681; F16N 7/363
See application file for complete search history.

(56) References Cited

U.S. PATENT DOCUMENTS

| | | | | | |
|---|---|---|---|---|---|
| 2,792,073 | A * | 5/1957 | Boss | ..................... | B25D 17/265 |
| | | | | | 55/528 |
| 4,265,334 | A * | 5/1981 | Benhase, Jr. | ............ | F01D 25/18 |
| | | | | | 60/39.08 |
| 4,479,682 | A * | 10/1984 | Olivier | ................ | F16C 33/6685 |
| | | | | | 384/475 |
| 4,509,659 | A * | 4/1985 | Cloutier | ................. | B67D 7/743 |
| | | | | | 222/110 |
| 5,253,985 | A * | 10/1993 | Ruetz | ...................... | F01D 25/18 |
| | | | | | 384/473 |
| 5,340,273 | A * | 8/1994 | Rockwood | .......... | F16C 33/6659 |
| | | | | | 415/173.5 |
| 5,411,366 | A * | 5/1995 | Rockwood | ........... | H02K 49/108 |
| | | | | | 415/173.5 |
| 5,499,902 | A * | 3/1996 | Rockwood | ........... | H02K 49/106 |
| | | | | | 417/423.12 |
| 8,167,492 | B2 * | 5/2012 | Natale | ................. | F16C 33/6681 |
| | | | | | 384/15 |

(Continued)

FOREIGN PATENT DOCUMENTS

DE            20009183 U1 * 9/2000 ......... B23Q 11/1015

*Primary Examiner* — Michael A Riegelman
(74) *Attorney, Agent, or Firm* — Sanchelima & Associates, P.A.; Christian Sanchelima; Jesus Sanchelima

(57) ABSTRACT

An engine shaft oil dispenser including an oil dispenser operatively connected to a mechanical system. The focus is the novel location and form of the oil dispenser, the delivery mechanism (tubes, passages in dispensers and shafts), as well as the filling mechanism of the annular-shaped dispenser (convenient port locations are provided). The annular-shaped dispenser is herein shown in several embodiments, including in a bearing stack, combined with a compressor/turbine disc/nut, and with various options for filling and feeding of oil. The present invention makes use of sometimes unused space in conventional stacks. The oil dispensers herein described are standalone or are incorporated into existing components. This results in more efficient and compact packaging.

12 Claims, 21 Drawing Sheets

(56) References Cited

U.S. PATENT DOCUMENTS

| | | | | |
|---|---|---|---|---|
| 8,888,447 B2* | 11/2014 | House | F16C 19/184 |
| | | | 415/177 |
| 9,726,040 B2* | 8/2017 | Gekht | F01D 25/18 |
| 9,752,616 B2* | 9/2017 | Saadi | F16C 33/6685 |
| 9,903,364 B2* | 2/2018 | Wallin | F04B 43/06 |
| 9,945,471 B2* | 4/2018 | Itoo | F16H 57/0441 |
| 9,957,890 B2* | 5/2018 | Baker | F01D 15/12 |
| 10,132,350 B2* | 11/2018 | Schmidt | F16C 27/045 |
| 11,635,134 B1* | 4/2023 | Currier | F16N 7/14 |
| | | | 184/6.4 |
| 2007/0183704 A1* | 8/2007 | Umekawa | F02C 7/06 |
| | | | 384/517 |
| 2008/0175704 A1* | 7/2008 | Rockwood | F04D 29/049 |
| | | | 184/14 |
| 2015/0107938 A1* | 4/2015 | Cervenka | B62J 31/00 |
| | | | 184/55.1 |
| 2018/0003223 A1* | 1/2018 | Schmidt | F16C 27/045 |
| 2019/0186689 A1* | 6/2019 | Smedresman | F16N 21/04 |

\* cited by examiner

ANNULAR AND SHAFT OIL DISPENSERS

1. OTHER RELATED APPLICATIONS

The present application is a continuation-in-part of pending U.S. patent application Ser. No. 17/576,196, filed on Jan. 14, 2022, which is hereby incorporated by reference.

II. BACKGROUND OF THE INVENTION

1. Field of the Invention

The present invention relates to an oil engine dispenser and, more particularly, to oil dispensers that are attached to mechanical systems to provide decentralized lubrication solutions. The present invention addresses short term lubrication issues in devices such as gearboxes, engines, turbomachinery, pumps, and/or different variations of lubricated devices, by presenting dispensers having suitable geometries to be attached thereto and lubricate bearings, gears, and/or any other mechanical component requiring lubrication. It is another feature of the present invention to provide cooling means to components such as seals or the like.

2. Description of the Related Art

Several designs for oil dispensers have been designed in the past. None of them, however, include an annular oil dispenser that has several configurations to provide lubrication solutions including decentralized oil storage, delivery, and metering with efficient packaging.

Applicant believes that a related reference corresponds to U.S. Pat. No. 4,265,334 issued for an apparatus for lubrication of a differential bearing mounted between concentric shafts. Applicant believes that another related reference corresponds to U.S. Pat. No. 9,945,471 issued for a lubricating apparatus for rotating shaft. None of these references, however, teach of an oil dispenser that is suitable to be adapted to a variety of engine structures by exhibiting shape variations. The oil dispenser, subject of the present application, also includes unique filling/expelling mechanisms with valves, restrictors, porous media, pressure compensated flow regulators, rupture discs and nozzles, that are cooperatively disposed in the dispenser's fill port and outlet in its various embodiments.

Other documents describing the closest subject matter provide for a number of more or less complicated features that fail to solve the problem in an efficient and practical way. None of these patents suggest the novel features of the present invention.

III. SUMMARY OF THE INVENTION

It is one of the objects of the present invention to provide an oil dispenser that is capable of being mounted to a mechanical device that includes rotating and non-rotating elements and configurations with convenient filling options, minimizing secondary operations for the removal, and placing back of components, required to fill the dispenser.

It is another object of this invention to provide an engine oil dispenser that fits in a limited, and many times unused, space in the compartment. This results in more volumetrically efficient and compact engine packaging.

It is yet another object of this invention to provide an engine oil dispenser that allows for its installation in a wide variety of engines with structural constraints. For example, engines with shafts that are too thin or flexible to be hollowed out and filled with oil. Or engine compartments that include other features that do not allow other packaging options except for engine oil dispensers having an annular shapes.

It is another object of this invention to provide an engine oil dispenser that, in one embodiment, is annular-shaped to fit in an engine compartment and readily inserted in and retained by the stack configuration.

It is another object of this invention to provide an engine oil dispenser that allows for lubrication of multiple adjacent bearings on a shaft. This allows lubrication to very effectively reach bearings deep within the engine.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

IV. BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 1 represents a sectional view of the oil dispenser 120 and the mechanical system 140 in accordance with exemplary embodiment 100.

FIG. 2 shows a sectional view of the annular-shaped dispenser 122 and the mechanical system 140 in accordance with exemplary embodiment 200.

Figure 2:
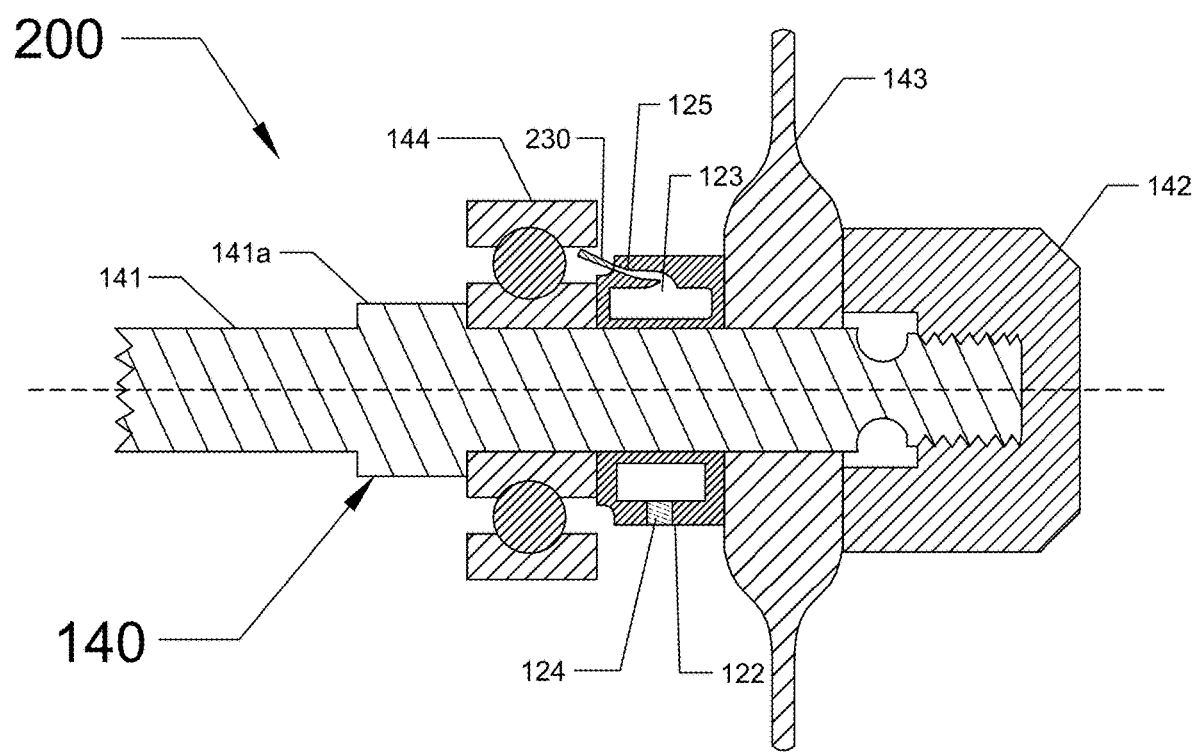
FIG. 2A shows a sectional view of the annular-shaped dispenser 122 and the mechanical system 140 in accordance with exemplary embodiment 200A.
FIG. 2B shows a sectional view of the annular-shaped dispenser 122 and the mechanical system 140 in accordance with exemplary embodiment 200B.
FIG. 2C shows a sectional view of the annular-shaped dispenser 122 and the mechanical system 140 in accordance with exemplary embodiment 200C.
Figure 2A:
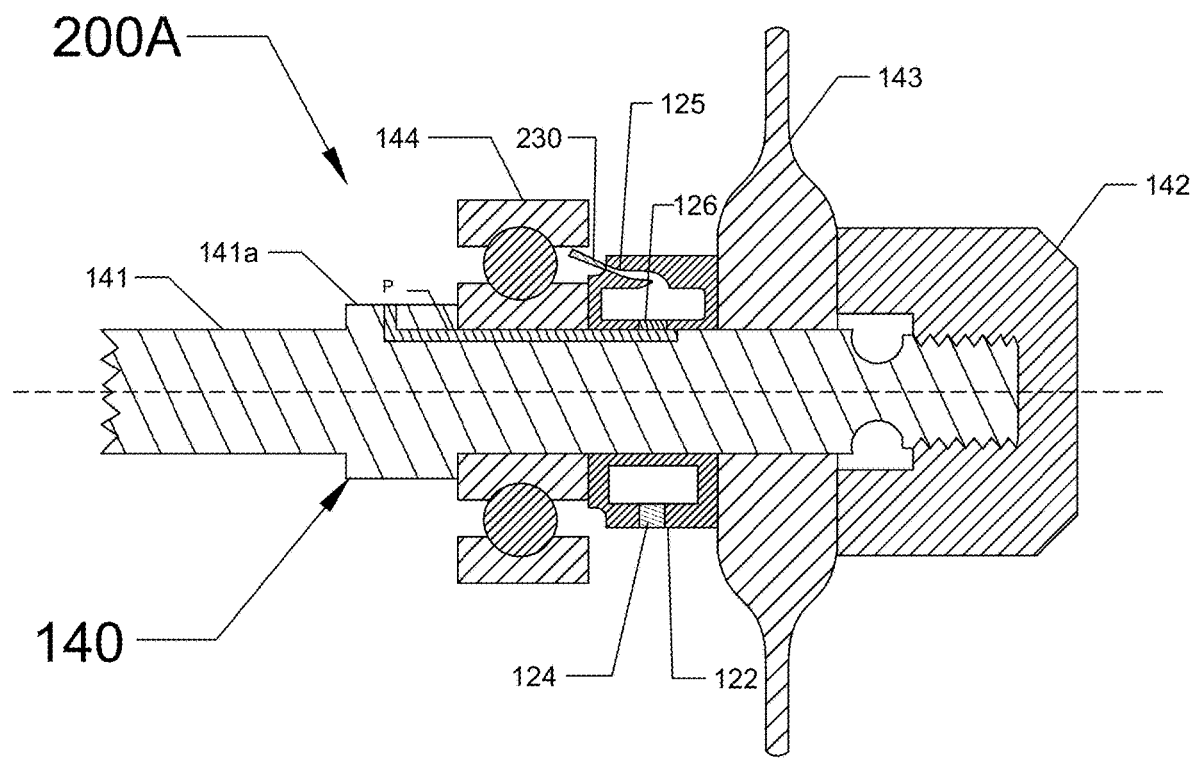
Figure 2B:
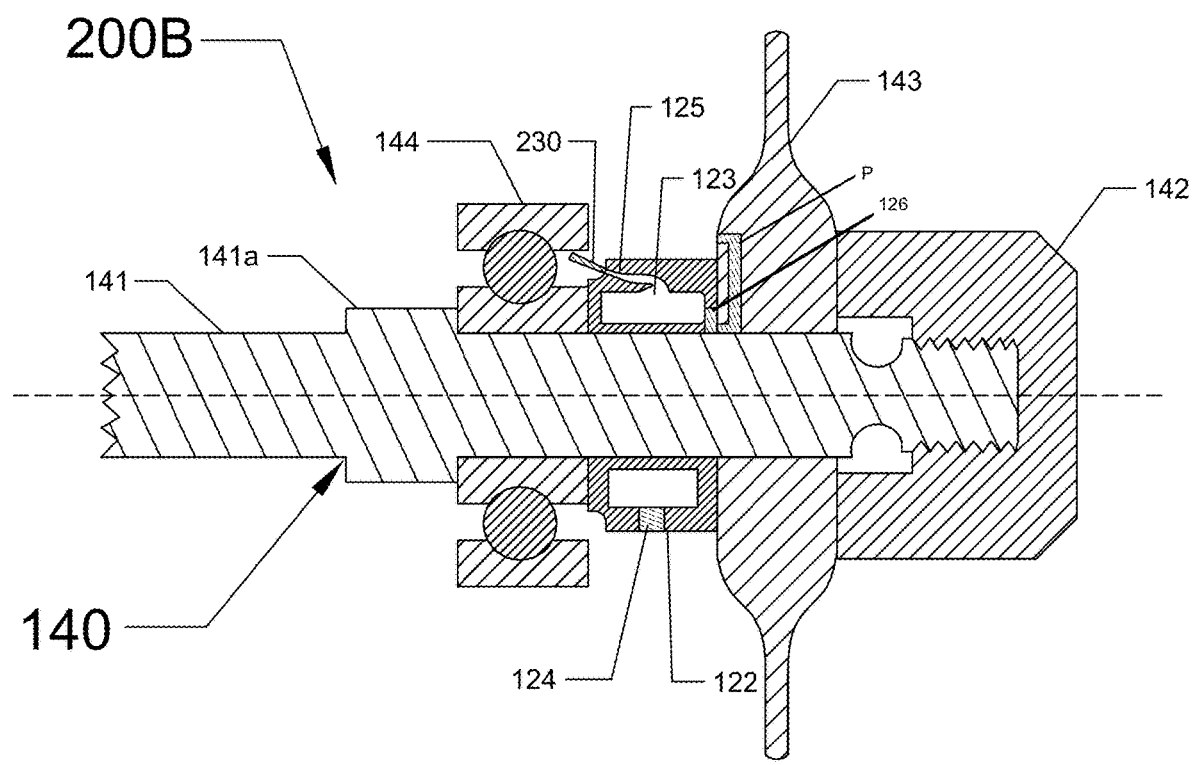
Figure 2C:
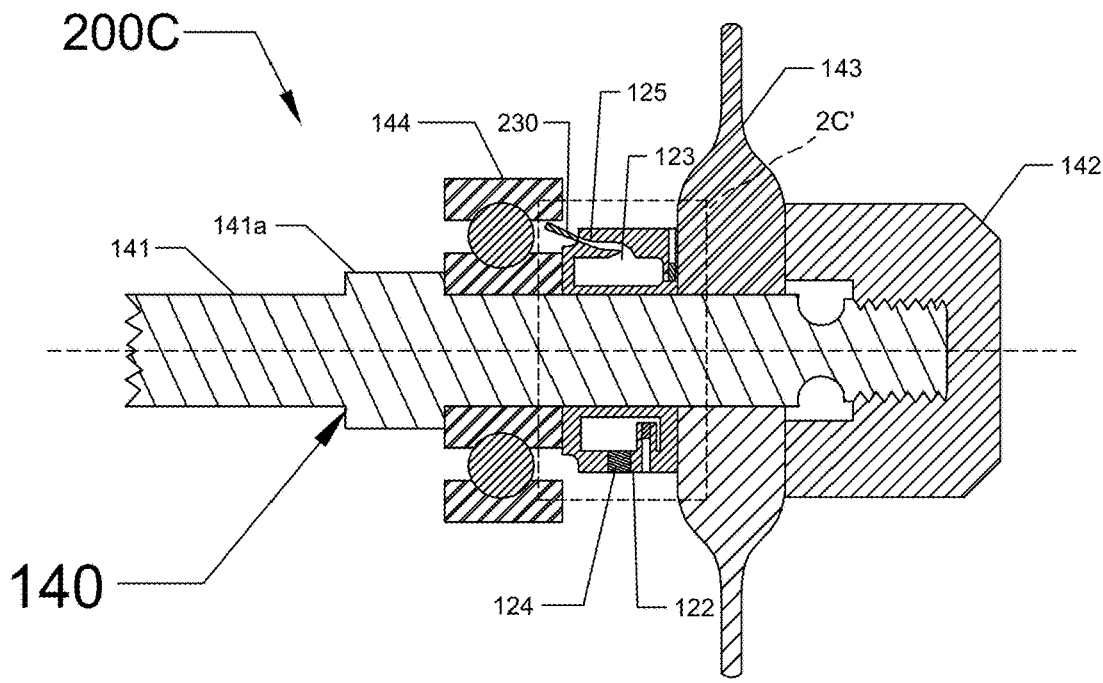
Figure 2C:
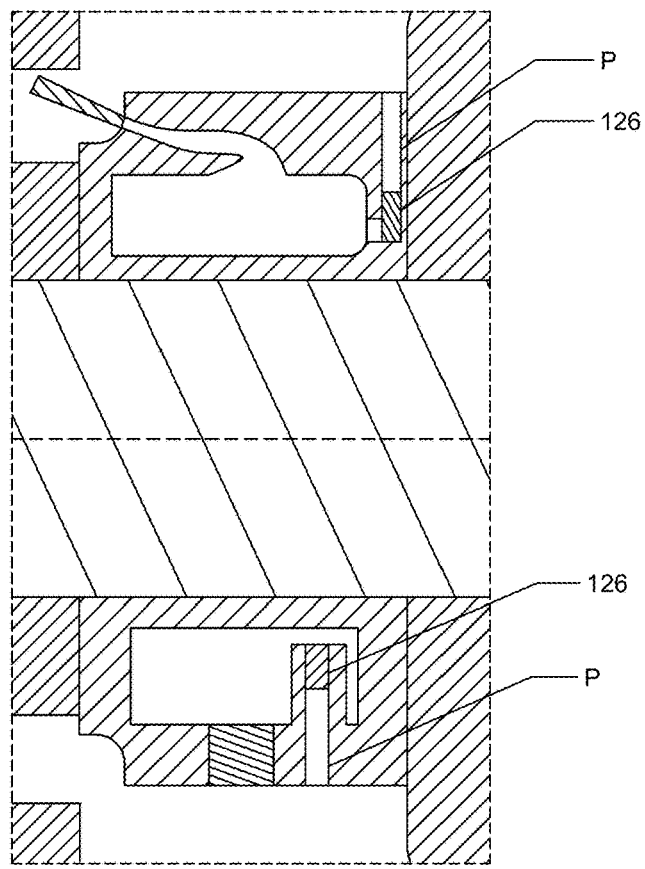

FIG. 2C' illustrates an enlarged sectional view of a portion of the annular-shaped dispenser 122 in accordance with exemplary embodiment 200C.

Figure 3:
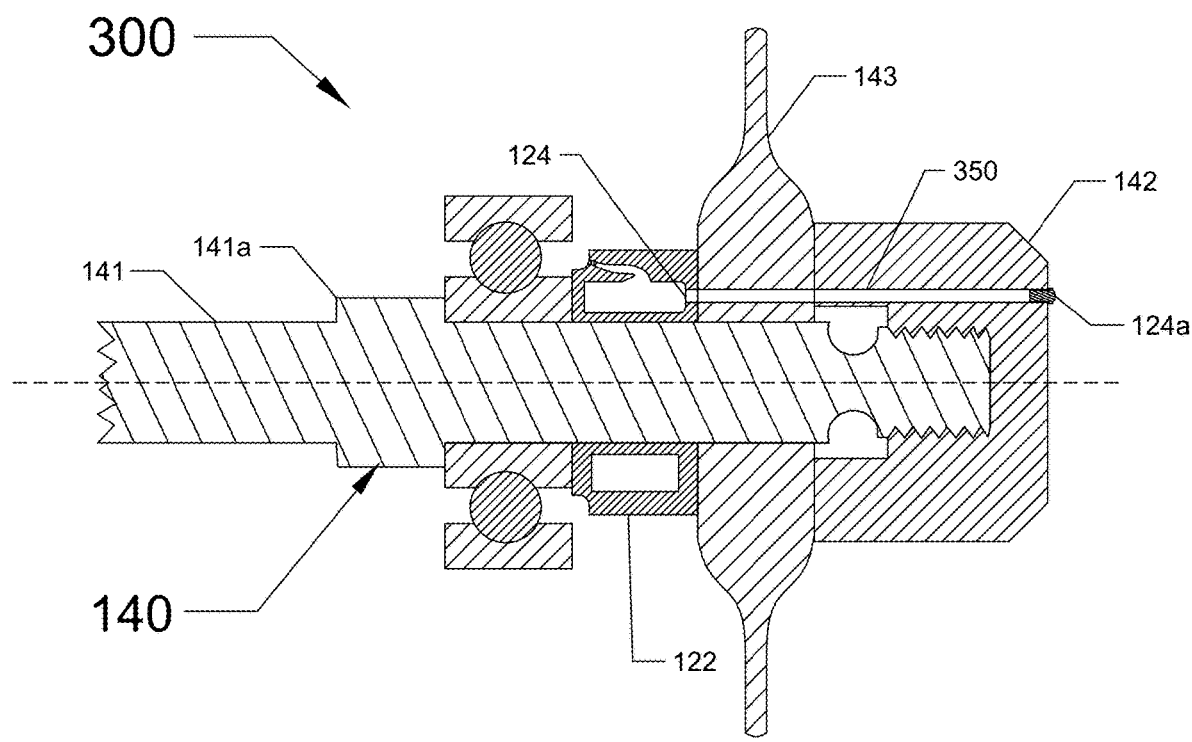

FIG. 3 illustrates a sectional view of the annular-shaped dispenser 122 and the mechanical system 140 in accordance with exemplary embodiment 300.

Figure 4:
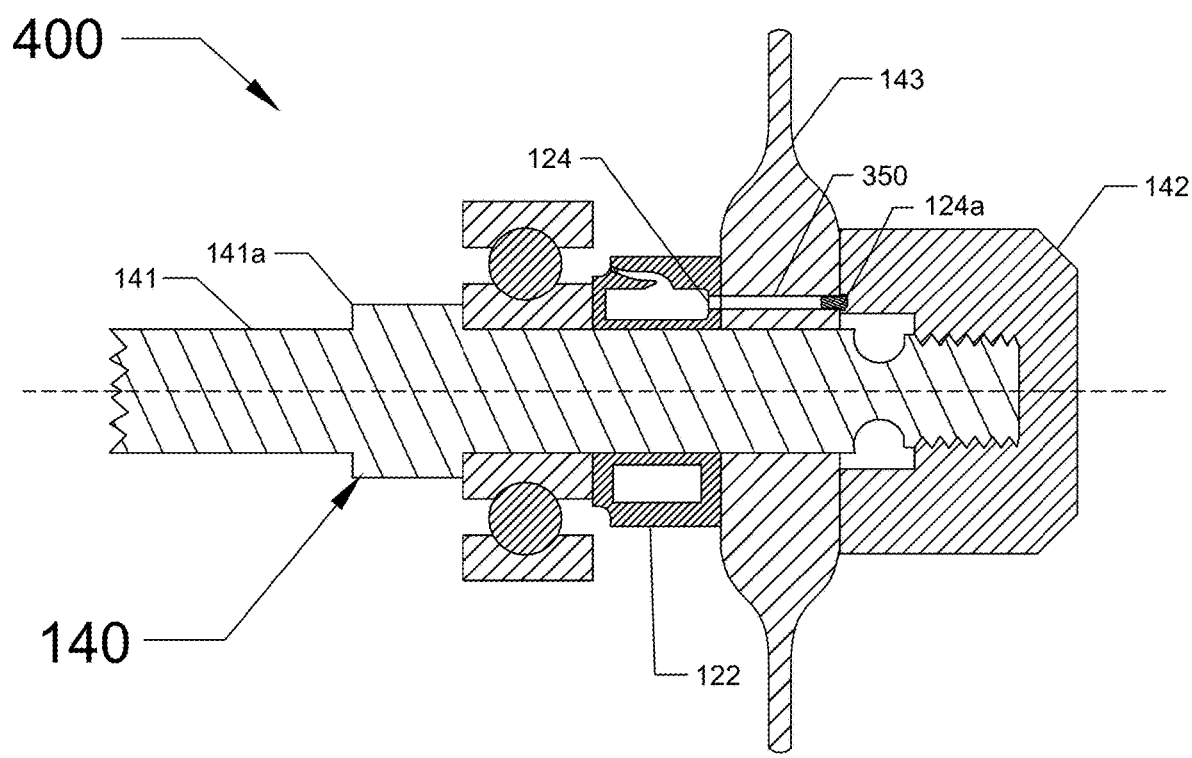

FIG. 4 is a representation of a sectional view of the annular-shaped dispenser 122 and the mechanical system 140 in accordance with exemplary embodiment 400.

Figure 5:
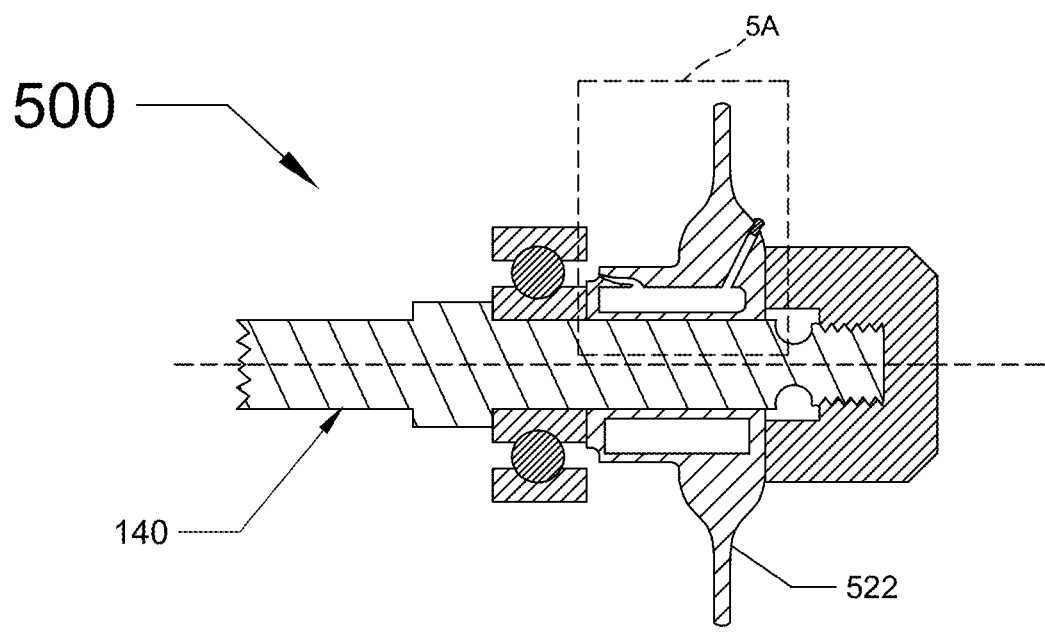

FIG. 5 is a sectional view of the turbine-embedded dispenser 522 and the mechanical system 140 in accordance with exemplary embodiment 500.

Figure 5A:
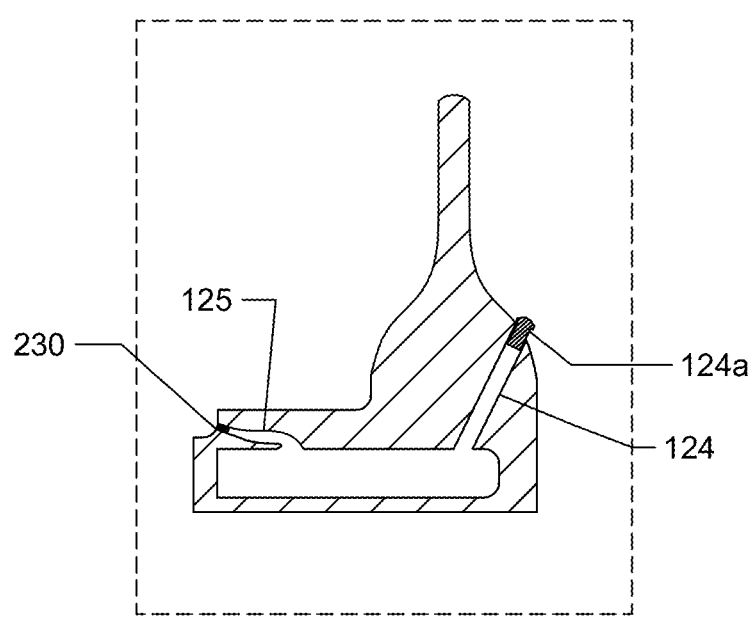

FIG. 5A is an enlarged sectional view of a portion of the turbine-embedded dispenser 522 in accordance with exemplary embodiment 500.

Figure 6:
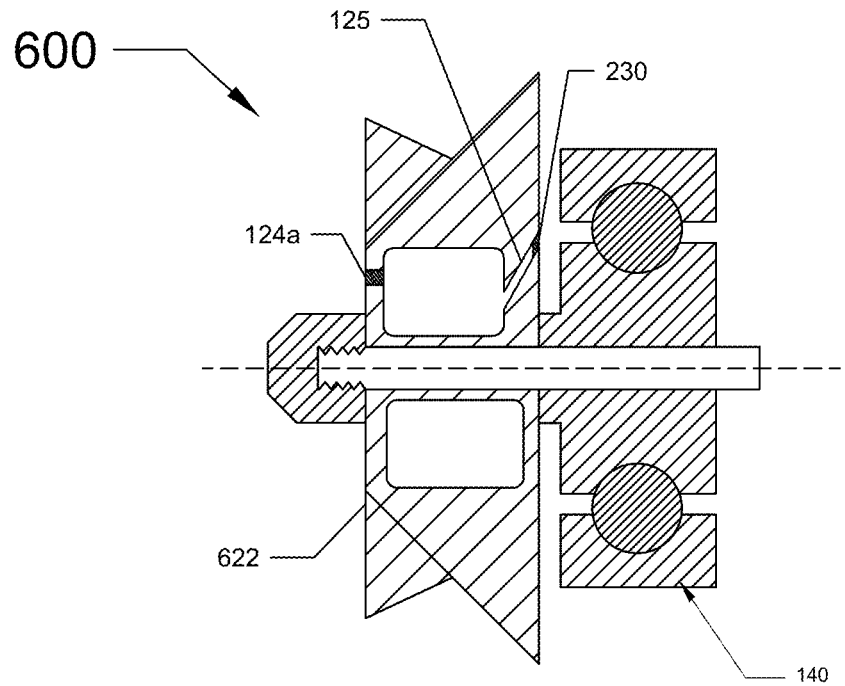

FIG. 6 represents a sectional view of the compressor-embedded dispenser 622 and the mechanical system 140 in accordance with exemplary embodiment 600.

Figure 6A:
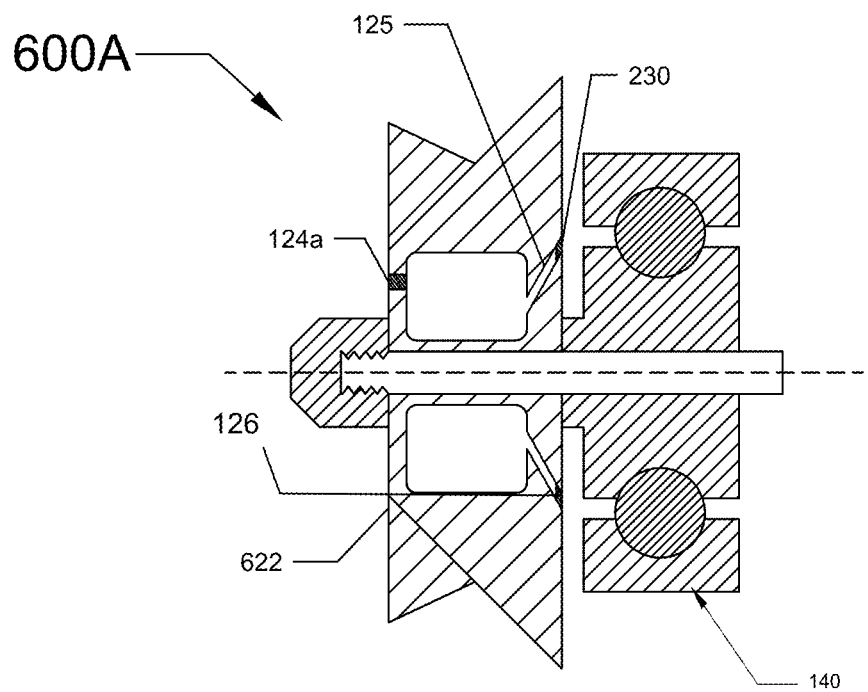

FIG. 6A represents a sectional view of the compressor-embedded dispenser 622 and the mechanical system 140 in accordance with exemplary embodiment 600A.

Figure 7:
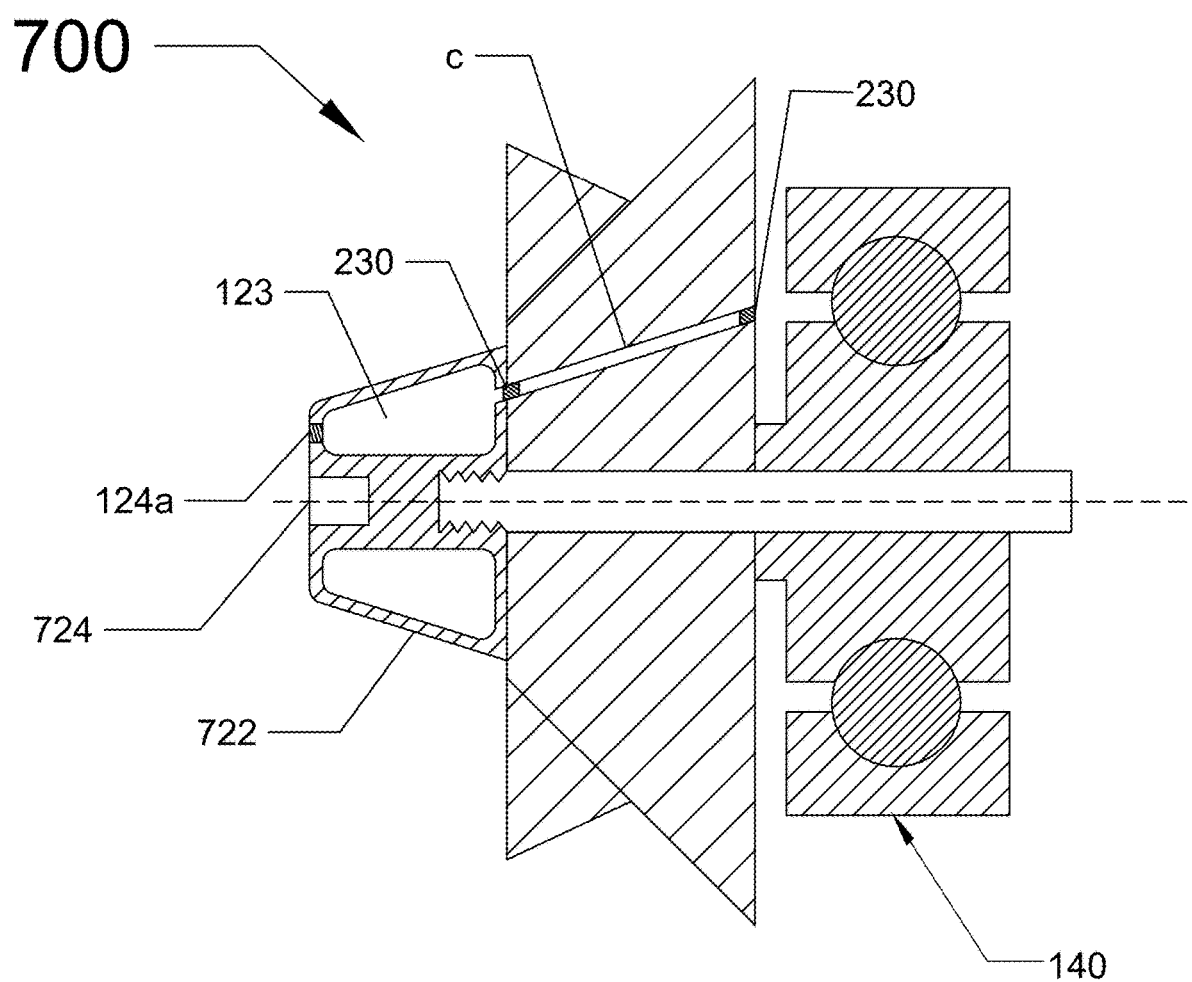

FIG. 7 shows a sectional view of the compressor-embedded dispenser 622 and the mechanical system 140 in accordance with exemplary embodiment 700.

Figure 8:
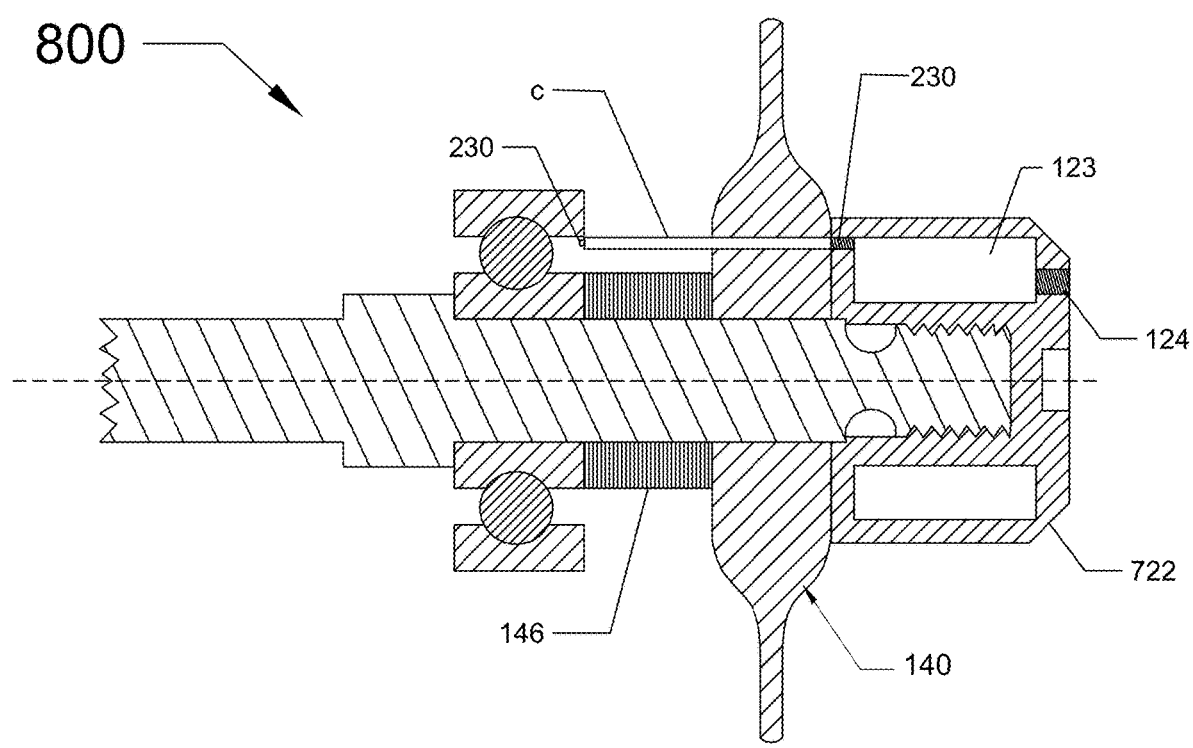

FIG. 8 illustrates a sectional view of the nut-embedded dispenser 722 and the mechanical system 140 in accordance with exemplary embodiment 800.

Figure 9:
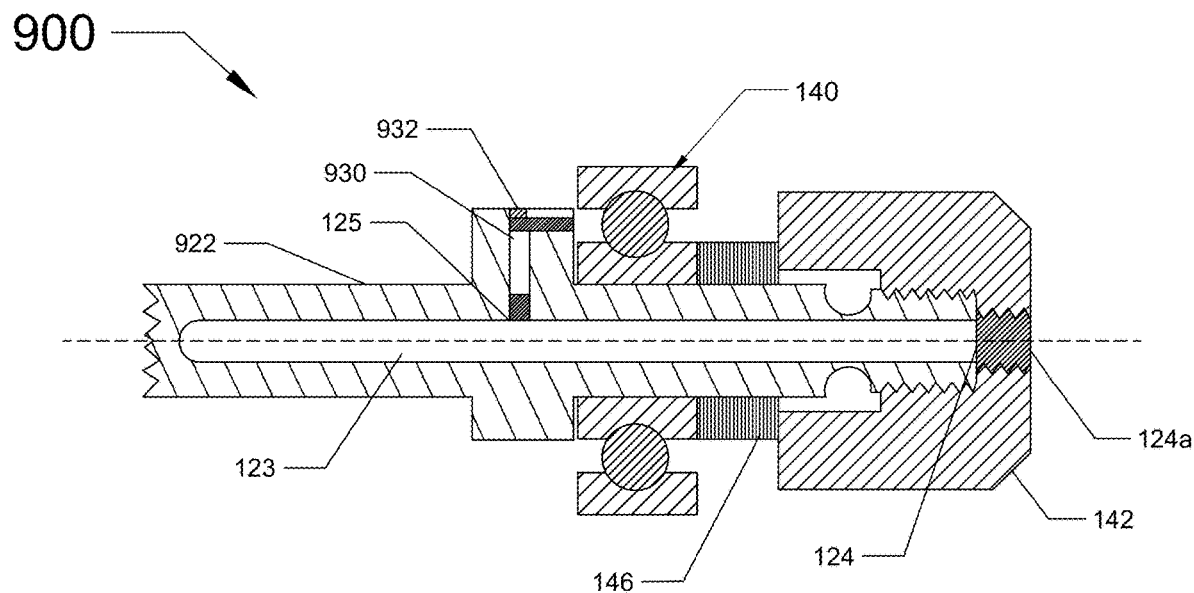

FIG. 9 is a representation of a sectional view of the shaft-embedded dispenser 922 and the mechanical system 140 in accordance with exemplary embodiment 900.

Figure 10:
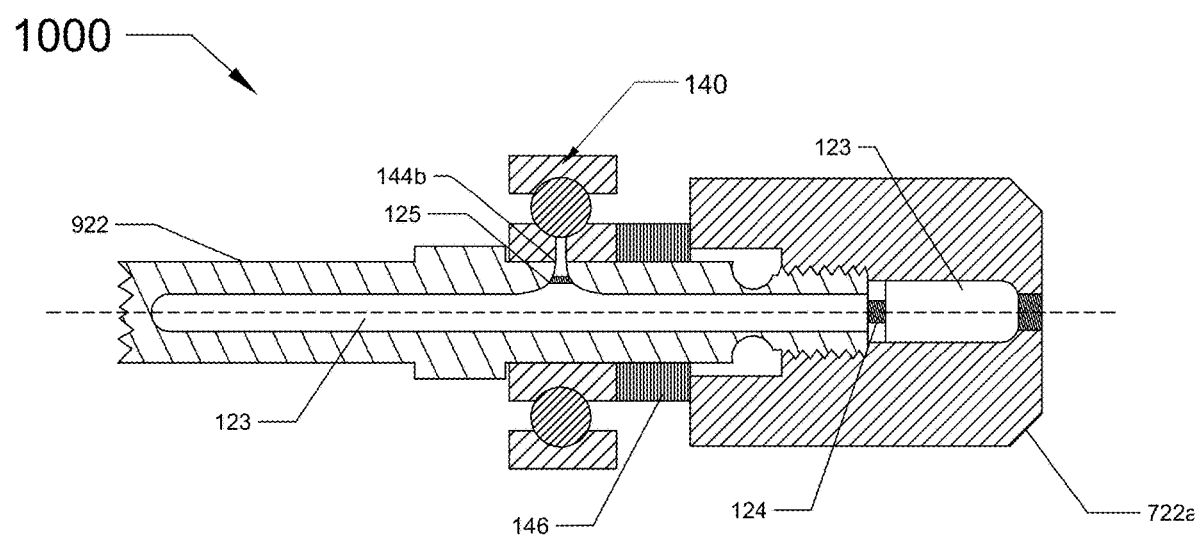

FIG. 10 is a sectional view of the shaft-embedded dispenser 922 and the mechanical system 140 in accordance with exemplary embodiment 1000.

Figure 11:
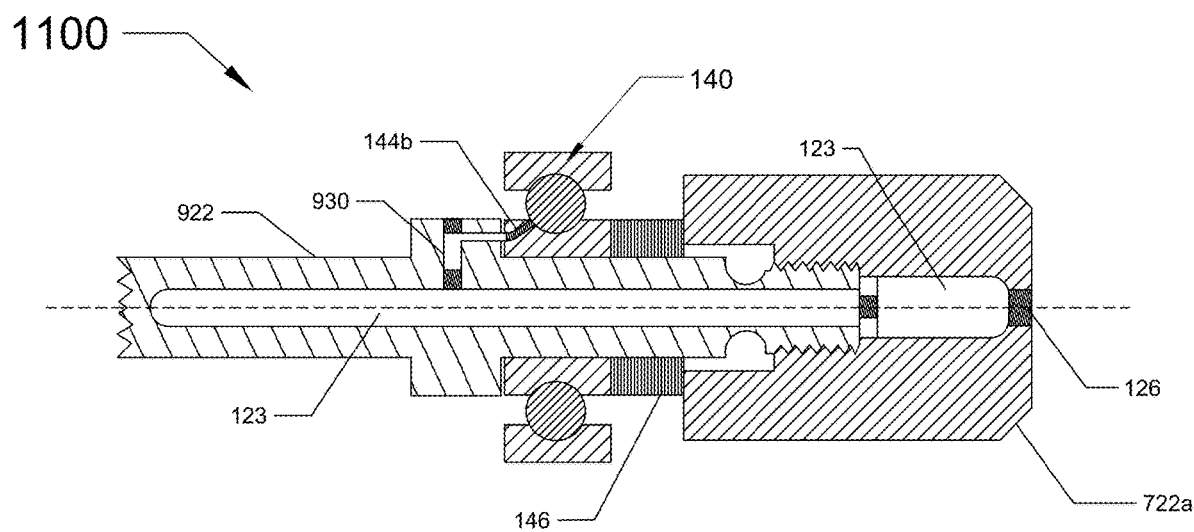

FIG. 11 illustrates a sectional view of the shaft-embedded dispenser 922 and the mechanical system 140 in accordance with exemplary embodiment 1100.

Figure 12:
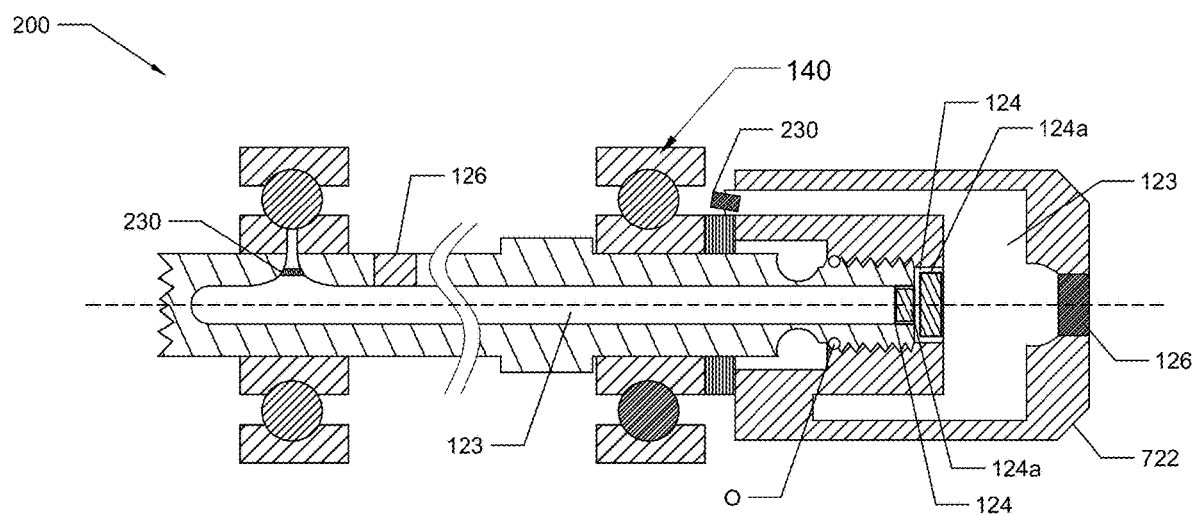

FIG. 12 is a representation of a sectional view shaft-embedded dispenser 922, the nut-embedded dispenser 722 and the mechanical system 140 in accordance with exemplary embodiment 1200.

Figure 13:
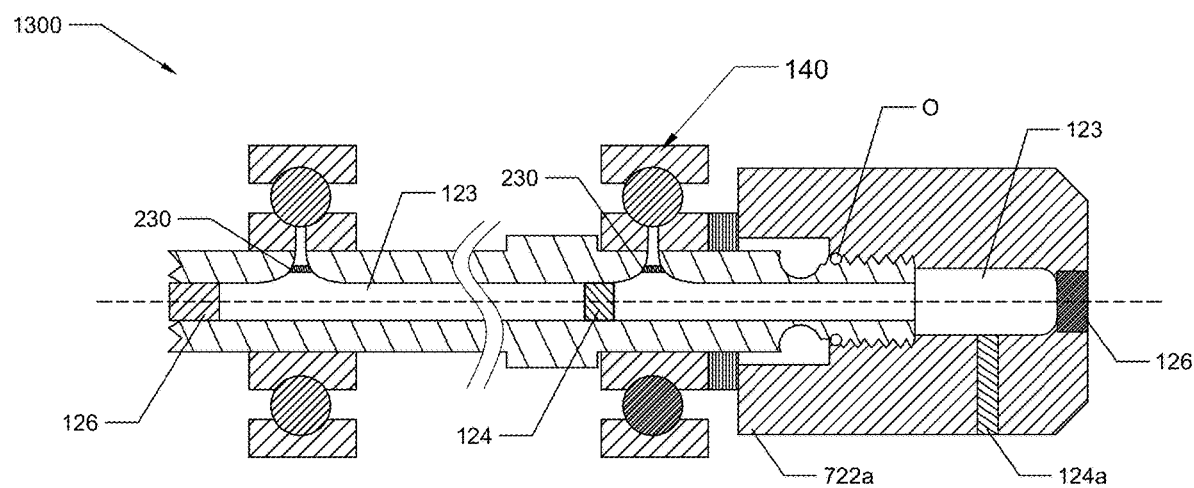

FIG. 13 is a representation of a sectional view shaft-embedded dispenser 922, the nut-embedded dispenser 722 and the mechanical system 140 in accordance with exemplary embodiment 1300.

Figure 14:
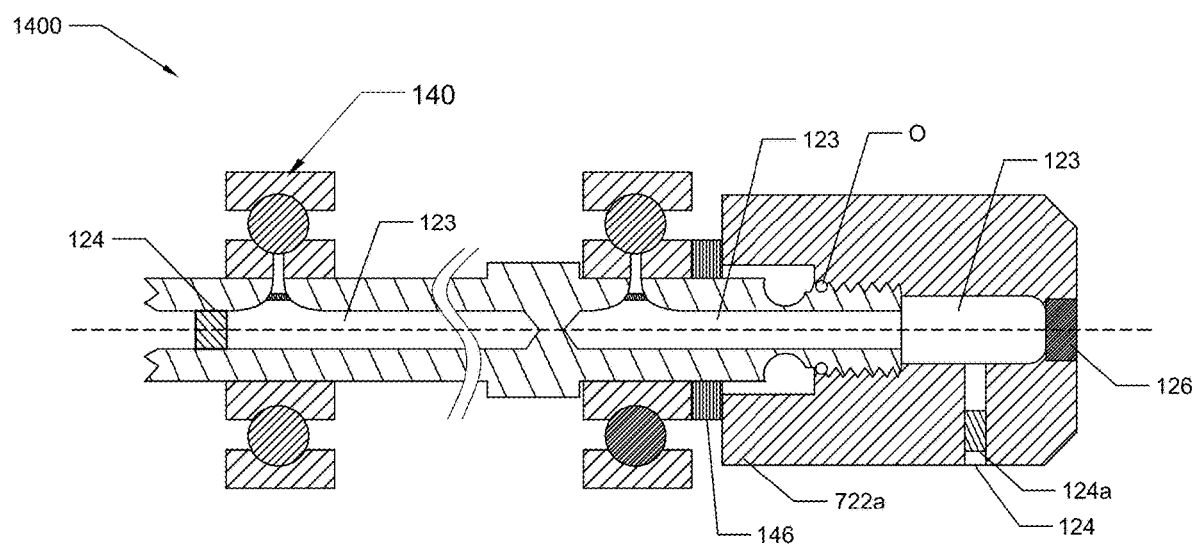

FIG. 14 is a representation of a sectional view shaft-embedded dispenser 922, the nut-embedded dispenser 722 and the mechanical system 140 in accordance with exemplary embodiment 1400.

Figure 15:
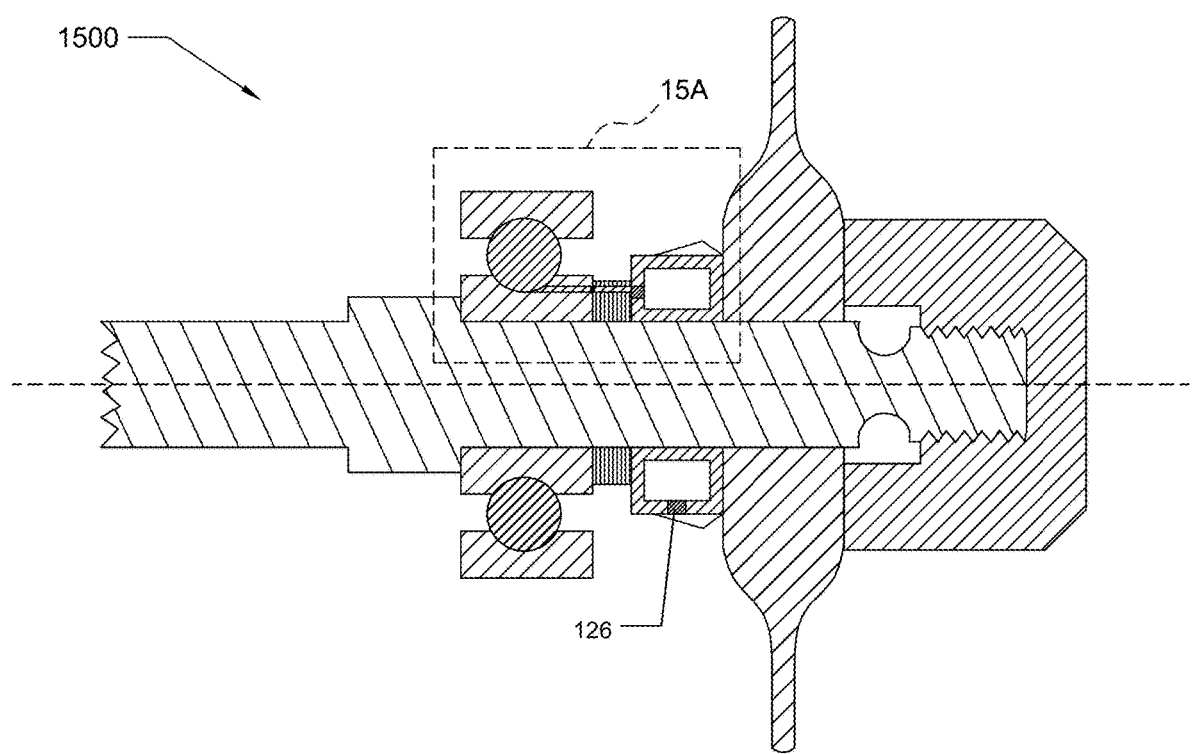

FIG. 15 shows a sectional view of the annular-shaped dispenser 122 having fins/fans 150 and the mechanical system 140 in accordance with exemplary embodiment 1500.

Figure 15A:
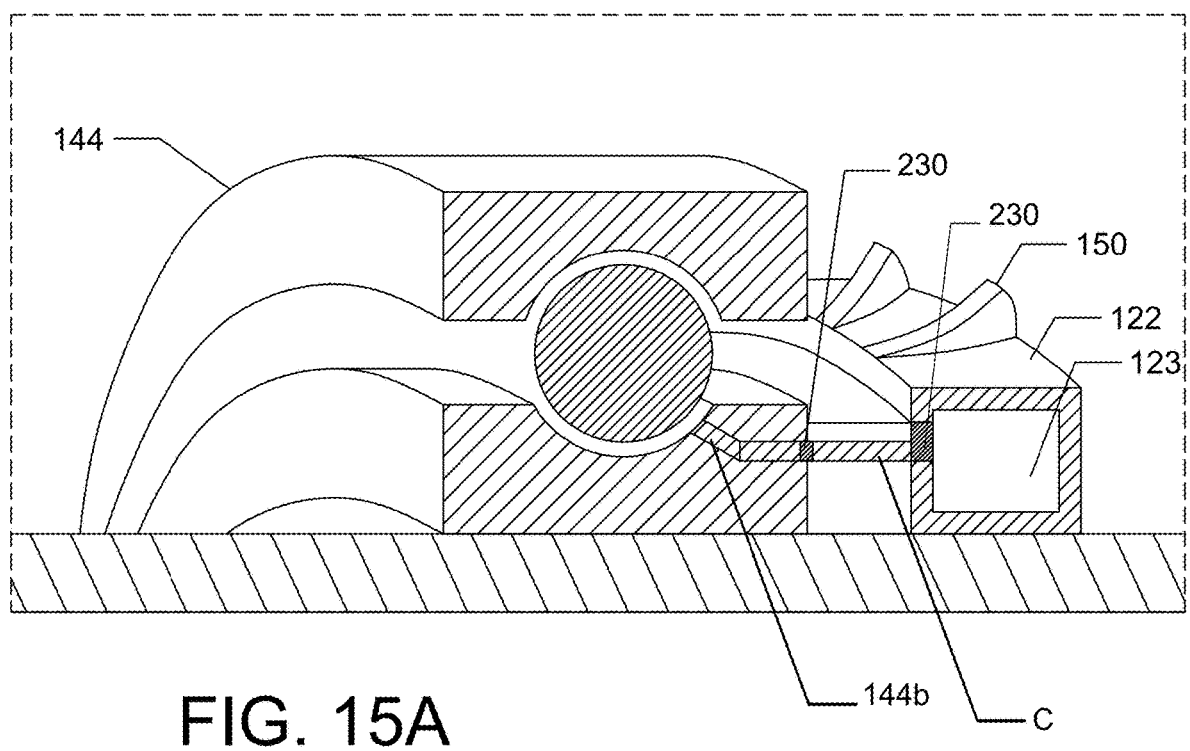

FIG. 15A is an enlarged sectional view of a portion of the annular-shaped dispenser 122 in accordance with exemplary embodiment 1500.

Figure 16:
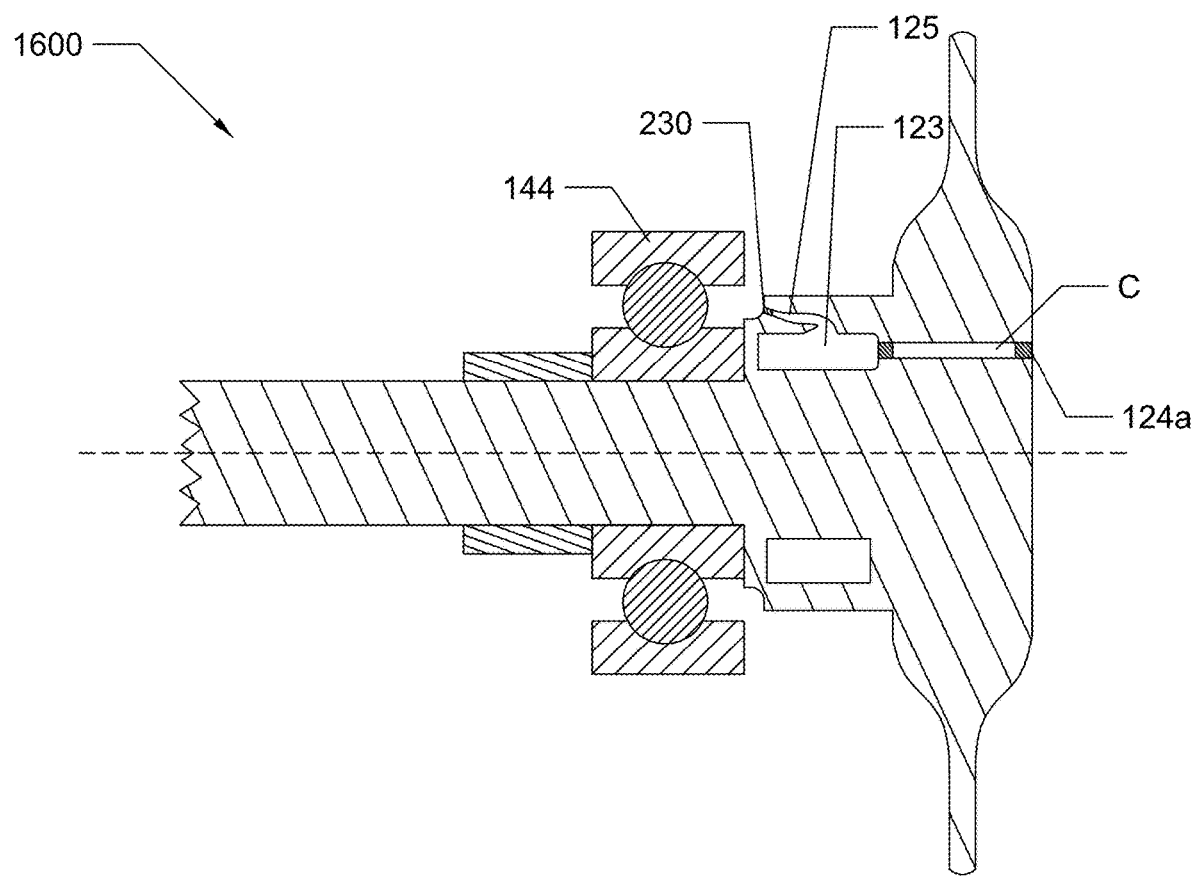

FIG. 16 shows a sectional view of a monolithic configuration of the present invention in accordance with exemplary embodiment 1600.

Figure 17:
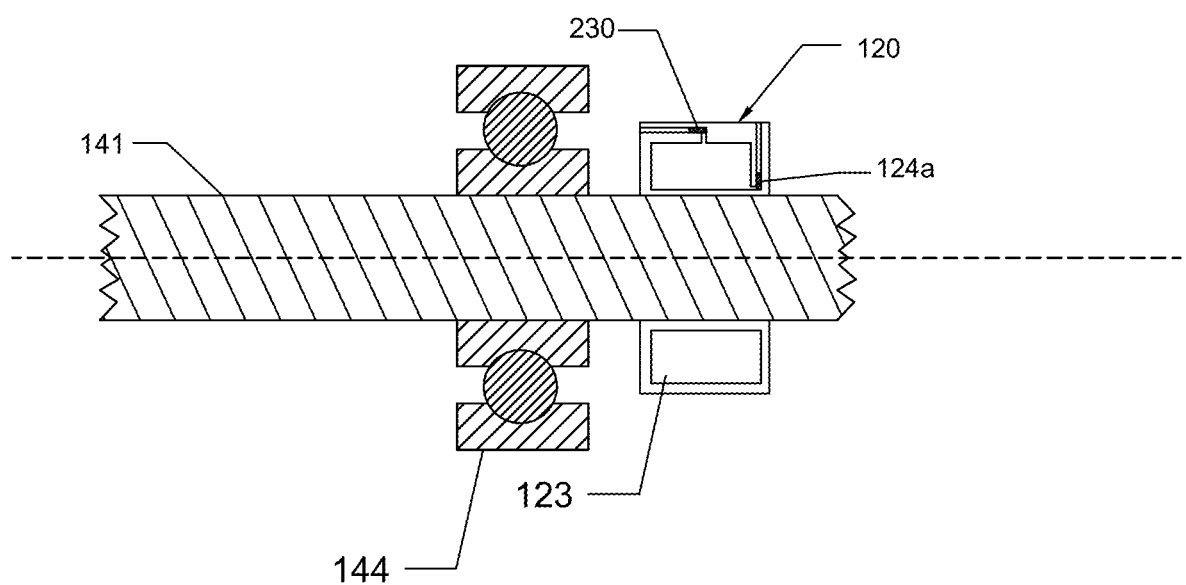

FIG. 17 shows an exemplary embodiment of the present invention.

V. DETAILED DESCRIPTION OF THE EMBODIMENTS OF THE INVENTION

Referring now to the drawings, where reference will now be made in detail to various embodiments of the present invention (100-1600). It can be observed that it basically includes a dispenser 120, and a mechanical system 140. It should be understood there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

Exemplary embodiments of the present disclosure will be described more fully hereinafter with reference to the accompanying drawings in which like numerals may represent like elements throughout the several figures, and in which various example embodiments are shown. Various embodiments may, however, be embodied in many different forms and should not be constructed as limited to the embodiments set forth herein. Therefore, specific details disclosed herein are not to be interpreted as limiting, but rather as a basis and/or principle for the claims, and/or as a representative basis for teaching one skilled in the art to employ this invention in different applications, including those that are not explicitly described herein.

Figure 1:
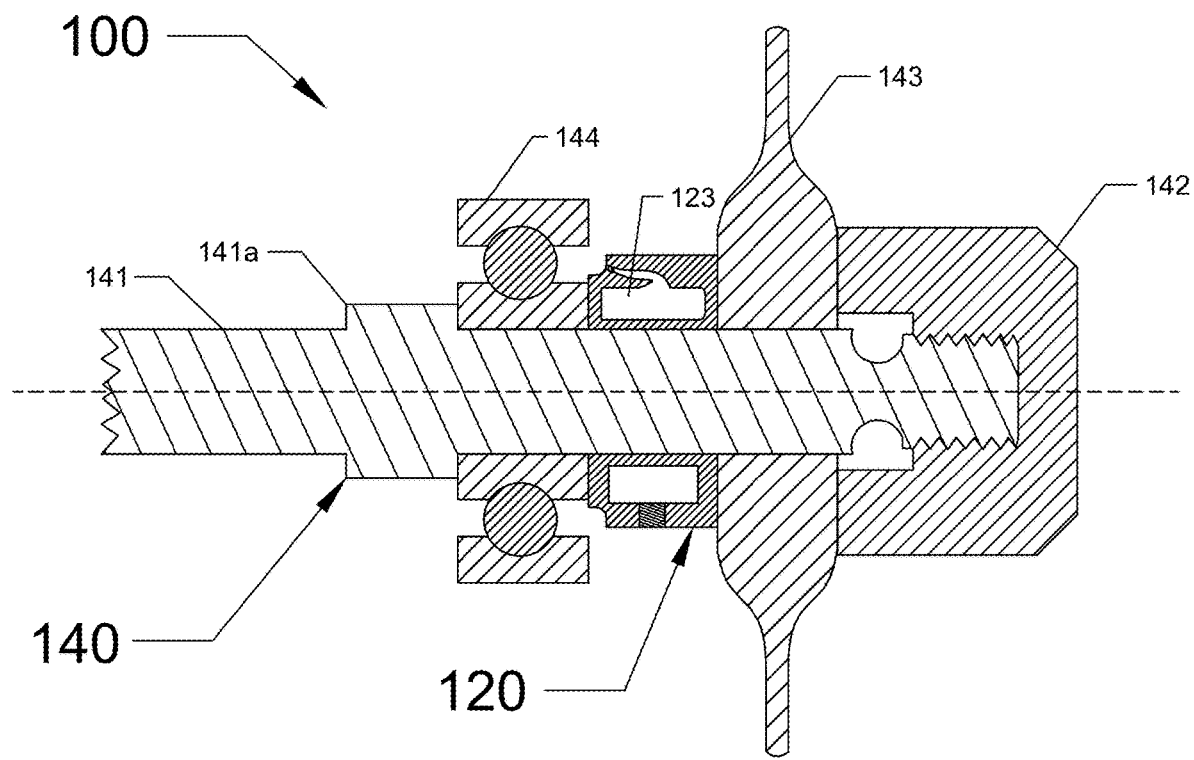

The dispenser 120 as shown in the exemplary embodiment 100 depicted in FIG. 1, is a component capable of being filled with a lubrication fluid, be it oil, through a fill port 124 to then store it within a reservoir 123. The dispenser 120 may include an outlet 125 to expel the oil therethrough. In a suitable embodiment, the dispenser 120 may be made of an engineering material. Dispenser 120 may also display maintained strength and creep-rupture properties at high temperatures. In one embodiment, the dispenser 120 may be manufactured using additive manufacturing. In another embodiment, the dispenser 120 may be made using subtractive manufacturing. In yet another embodiment, the dispenser may be made of carbon steel, alloy steel, stainless steel, tool steel, brass, bronze, iron, aluminum, nickel-based alloy, ceramics, polymers, fibers, metal alloy, composite materials, or any variation or combination thereof. The dispenser 120 may be volumetrically suitable to be mounted on existing engines. As will be described in the following paragraphs, the dispenser 120 in various embodiments may present novel locations and geometries that adapt to different scenarios where lubrication means need to be externally mounted on a shaft without modifying the structure and/or the stack of the engine.

Better described in FIG. 2, in an exemplary embodiment 100 of the oil dispenser 120 includes an annular-shaped dispenser 122, a mechanical system 140 may include a shaft 141, a nut 142, a turbine 143, a bearing 144. Nonetheless, the aforementioned elements are recited for illustrative purposes, it should be understood that the mechanical system 140 may include any other suitable mechanical component as known in the art. The mechanical system 140 may have a rotating and non-rotating configuration which depends on the type of components that may compose it. The mechanical system 140 may be part of motor vehicles, aircraft vehicles, turbine engines, watercraft vehicles, electric motors, engines, wind turbines, and/or the like. Due to operating conditions, the mechanical system 140 may heat, and if predetermined elements thereof present a lack of lubrication, it may lead the system 140 to shorten its life span and/or mechanical failures. The bearing 144, the annular-shaped dispenser 122, the turbine 143, and the nut 142 may be externally mounted to the shaft 141 in the recited order, however, elements may be arranged in different configurations depending on the application requirements. As shown in the present exemplary embodiment 100, the shaft 141 may exhibit a bump-out 141a to increase/decrease its diameter, and/or to serve as a physical limit that impedes elements to freely slide along the shaft 141. The shaft 141 may have a threaded distal end at which additional elements may be fastened to. The embodiment shown in FIG. 1 shows the nut 142 clamping down the bearing 144, the annular-shaped dispenser 122, and the turbine 143 against the bump-out 141a. In the present embodiment, the annular-shaped dispenser 122 may be flush with the bearing 144 and in abutting contact to deliver oil thereto.

The annular-shaped dispenser 122 may include an inner reservoir 123, a fill port 124 and an outlet 125. The reservoir 123 may conform with the shape of the dispenser 122. As disclosed later, the annular-shaped dispenser 122 may include different embodiments in which its shape may vary, thus the shape and location of the reservoir 123, the fill port 124 and the outlet 125 may vary as well. In the present embodiment, the reservoir 123 may be in the form of an annular chamber inside the annular-shaped dispenser 122. Reservoir 123 may be volumetrically suitable to receive and store a lubrication fluid therein, be it oil for explanatory purposes. The outlet 125 may permit to expel the lubrication stored within the reservoir 123 to an exterior thereof. Additionally, in the present embodiment, the annular-shaped dispenser 122 may include a relief valve 126 used to prevent a vacuum from building inside the dispenser 122 as the fluid is dispensed. In a suitable configuration, the outlet 125 may be proximal to an inner race 144a of the bearing 144, thereby the oil expelled through the outlet 125 may be received by the bearing 144 defining an external source of short term lubricant. The fill port 124 may be located on an external surface of the annular shaped dispenser 122 in a radial direction and may be used to access the reservoir 123 from outside of the dispenser 122. It may be suitable to include an element to seal the reservoir 123 once oil has been introduced therethrough. In one embodiment, a plug may be screwed, welded, or the like, into the fill port 124 to seal it. In another embodiment a fill valve 124a may be disposed within the fill port 124. The fill valve 124a may be unidirectional or bidirectional depending on the application requirements. Additionally, in another variation of the present embodiment, the fill port 124 may be bidirectional as to allow function as a relief valve.

Best illustrated in FIG. 2, in another exemplary embodiment 200 of the present invention, the annular-shaped dispenser 122 further includes at least one of an element 230 that may be one of a restrictor/rupture disc/valve/porous media/nozzle/pressure compensated flow regulator, to operatively work with the annular-shaped dispenser 122 at the outlet 125. It is recited that the outlet 125 may receive at least one element 230 because, depending on the application the present invention may be subject to, it may be necessary and suitable to combine different elements in the outlet 125 to achieve a desired behavior of the present invention when expelling oil. Element 230, in its different variations, may be an integral element or a modular component. A nozzle permits to focalize the zone upon which lubrication may be most required. It may be suitable that in a different embodiment the nozzle may be an atomizing nozzle which is designed to create a fluid mist, an aerodynamic nozzle, or any other suitable variation as known in the art. It is well known by a reasonably skilled person that there are areas of mechanical components prone to heat up due to workloads. In the present explanatory embodiment, wherein the component that is to be lubricated is a bearing 144, by including the nozzle the oil may be delivered directly upon the bearing cage, which encloses the ball/roller. A restrictor may be a traditional non-integral/integral restrictor as known in the art, may be used for a precise control of oil flow rate from the inside of the annular-shaped dispenser 122 to the outside thereof. The restrictor may also be an integral flow restrictor as disclosed in U.S. application Ser. No. 17/750,534. The rupture disc (known in the art as "burst" disc) is an element that physically bursts to allow flow through, at a critical pressure, with distinct open and closed states, for exemplary purposes a frustum reverse buckling disk may be used. The valve as known in the art may be a passive valve, an active valve, a solenoid valve, a proportional flow valve, a flow control valve, an electric valve, an analog valve, or the like. The porous media may offer a structure with customized permeability that permits to further restrict the flow of oil. The pressure compensated flow regulator may ensure a constant flow rate of the oil when expelled regardless of pressure variations that may occur inside the reservoir due to operating conditions. Such element is widely known in the art, and it may be suitable to include it in the present invention if required. In the present embodiment 200, and for explanatory purposes, element 230 is a nozzle, as previously described, to focalize the zone upon which lubrication may be most required, be it the inner race 144a.

As shown in FIG. 2A-2B, in exemplary embodiments 200A-200B the annular-shaped dispenser 122 may include the relief valve 126 operatively connected to the reservoir 123. Exemplary embodiment 200A exhibit a passage P that, in the present embodiment, is built in the shaft 141 and is connected to the relief valve 126 that permits relief air flow to enter into the reservoir 123 to prevent a strong vacuum from forming. Exemplary embodiment 200B, presents a variation of the location of the passage P, in which the relief valve 126 is not disposed radially but parallel with the shaft as shown. In this embodiment the passage P may be disposed within an inner cross section of the turbine 143. It should be understood that the passage P may be disposed in different locations that are case depending, the aforementioned embodiments 200A-200B are hereby presented for explanatory purposes.

As depicted in FIGS. 2C-2C', the exemplary embodiment 200C presents a variation of the annular-shaped dispenser 122 having the passage P in an inner-cross section thereof that connects the reservoir 123 with the exterior of the annular-shaped dispenser 123. In the present embodiment the passage P may be volumetrically suitable to receive the relief valve 126 therein for the purposes previously described. The passage P may follow different trajectories depending on the application. The passage P as shown in the present embodiment intends to present an exemplary disposition thereof, nonetheless, the location and trajectory of the passage P may be case dependent.

As shown in FIGS. 3-4, in additional exemplary embodiments 300 and 400 respectively, the fill port 124 of the annular-shaped dispenser 122 may be parallel to the shaft 141 and may be pointing opposite to the outlet 125. In embodiment 300, a jumper tube 350 may be connected to the fill port 124 and may traverse the turbine 143 and the nut 142 longitudinally. In contrast with embodiment 400 wherein the jumper tube 350 may be shorter in length and may only traverse the turbine 143. A distal end of the jumper tube 350 may be exposed on the aft of the engine. At said distal end, the jumper tube 350 may include a fill valve 124a as described for embodiment 100. The jumper tube 350 may extend perpendicularly with respect to the shaft 141. However, the jumper tube 350 may also be connected to a predetermined incident angle, depending on the application requirements to present a slope. Embodiments 300 and 400 may permit an easy filling as well as extra oil storage inside the jumper tube 350. Depending on the location of the present invention, it may be easier for a user to access the nut 142 to clamp/unclamp the rest of the elements. Both embodiments 300 and 400 intend to provide easy filling means to users so it may not be necessary to disassemble all the elements to fill/refill the reservoir with the lubrication fluid. It may be suitable to include at least one element 230 that may be one of the restrictor/rupture disc/valve/porous media/nozzle/pressure compensated flow regulator, as previously described, inside the outlet of these embodiments (300-400) as described for embodiment 100. Additionally, in these exemplary embodiments (300-400) the annular-shaped dispenser 122 may be replaced by a solid spacer in a conventional stack. In order to get oil from the fill port 124 to the annular-shaped dispenser 122 (or any of its variations) the jumper tube 350 may be used. It also may be suitable that the components such as (and for explanatory purposes) the nut 142, the turbine 143 and/or the like, to include aligning holes that allow oil to travel across the stack. In the latter case, it may be suitable to include an o-ring O or a similar seal as known in the art to prevent leakage at the interfaces between the components.

In another exemplary embodiment 500 best illustrated in FIG. 5, the present invention may feature a combined turbine 143 as known in the art and the annular-shaped dispenser 122 hereinafter termed as turbine-embedded dispenser 522. The turbine-embedded dispenser 522 exhibits the functionalities of the turbine while providing short term lubrication means by including the built-in inner reservoir 123 of the annular-shaped dispenser 122. The turbine-embedded dispenser 522 may include blades extending outwardly and radially from an annular center portion that encloses the reservoir 123. The turbine-embedded dispenser 522 may also present the fill port 124, and the outlet 125. In the present embodiment 500, the outlet 125 may be axially disposed in a lateral side of the turbine-embedded dispenser 522 facing the element that may be lubricated, be it the bearing 144 for explanatory purposes. In different embodiments, the turbine-embedded dispenser 522 may be clamped by two elements at lateral sides, making it inconvenient to include a fill port 124 thereon. To address this problem, the fill port 124 may be facing a radial direction, or a substantially radial direction as it may present a predetermined slope depending on the arrangement and general structure of the blades so that it may be feasible to access the fill port 124 without disassembling all the elements mounted on the shaft 141. As in the aforementioned embodiment, the fill port 124 may include a sealing element to prevent oil to be expelled therethrough, preferably the fill valve 124a, however other means may be used such as a plug or the like. The outlet 125 in the present exemplary embodiment 500 may receive at least one element 230 that may be one of the restrictor/rupture disc/valve/porous media/nozzle as previously described.

Better depicted in FIG. 6, in another exemplary embodiment 600, the present invention may feature a compressor-embedded dispenser 622 which may inherit the structural characteristics of the annular-shaped dispenser 122 such as its annular shape to be mounted on the shaft 141, the reservoir 123, the fill port 124, the outlet 125 in combination with compressor disc as known in the art. The compressor-embedded dispenser 622 is a combination of a compressor disc as known in the art with the capabilities of providing short term lubrication means. In the present embodiment 600, the compressor-embedded dispenser 622 may be mounted on the shaft 141 preferably in abutting contact at a lateral side with a mechanical element that may need lubrication, be it a bearing 144 for illustrative purposes, but can be any other suitable element. As shown, the compressor-embedded dispenser 622 may be clamped down by the nut 142. Given the geometry of the compressor-embedded dispenser 622 it may be suitable for the fill port 124 to be disposed axially on a lateral side thereof. Nonetheless, in the present embodiment 600, the fill port 124 may be disposed wheresoever on the exterior surface of the compressor-embedded dispenser 622. As with previous embodiments, it may be suitable to include the fill valve 124a in the fill port 124. Wherein the fill valve 124a may permit an exterior lubrication fluid to be inserted into the reservoir 123, and the plug may seal it. The outlet 125 may be pointing towards the element that may be lubricated. Additionally, in the present exemplary embodiment 600 it may be suitable to include at least one element 230 that may be one of the restrictor/rupture disc/valve/porous media/nozzle/pressure compensated flow regulator, as previously described, into the outlet 125 to exhibit different variations in the way the oil is expelled that is subject to the requirements of the application.

As represented in FIGS. 7-8, exemplary embodiments 700 and 800, respectively, show a combination of the nut 142 with the annular-shaped dispenser 122 hereinafter termed as nut-embedded dispenser 722 which may be used to clamp elements mounted on the shaft 141 or the like, while providing short term lubrication means. The nut-embedded dispenser 722 may exhibit the structural elements of the annular-shaped dispenser 122 such as the reservoir 123, the fill port 124 and the outlet 125. In embodiment 700, a compressor disc 145 may be located between the nut-embedded dispenser 722 and the element that may need lubrication, such as the bearing 144. For the lubrication fluid to reach the bearing 144 it may be necessary to transport the fluid through the compressor disc 145. To achieve it, the compressor disc 145 may include a conduit C that may be a passage built into an inner cross-section thereof, wherein the conduit C may be operatively connected at one distal end with the outlet 125 whereas the opposite distal end may be in communication with the element to be lubricated (be it the bearing 144). In another variation, the conduit C may not be formed in the dispenser but may be a separate element, be it a tube for explanatory purposes, that may be operatively connected with the dispenser. The conduit C may be independent in each element to then be aligned to permit fluid of oil therethrough or may be a single conduit C that traverses the components in the stack. The trajectory followed by the conduit C may be case dependent, as there may be embodiments that require the conduit to be completely vertical, horizontal, it may exhibit switchbacks, it may exhibit curves, and/or the like. At the distal end of the conduit C there may be suitable to include at least one element 230 that may be one of a restrictor/rupture disc/valve/porous media/nozzle/pressure compensated flow regulator, as previously described, so that element 230 may be located at either distal end thereof. Depending on the general geometry of the compressor disc 145 and the element to be lubricated, the conduit C may exhibit a predetermined slope. In embodiment 700 there may be a sealing element between the distal end of the conduit C and the outlet 125. The nut-embedded dispenser 722 may include a wrench feature 724 disposed on an opposite side from which the nut-embedded dispenser 722 may receive the shaft 141 wherein the wrench feature 724 may be aligned with the shaft 141. The wrench feature 724 may be an opening configured to receive a wrench (not shown in the figures) to tighten/loosen the nut-embedded dispenser 722. In additional variations of the present embodiment, the wrench feature 724 may be disposed internally or externally. The fill port 124 may be located on the aft on the nut-embedded dispenser 722 in the axial direction and may include the fill valve 124a. Nonetheless, the fill port 124 may also be located within the wrench feature 724.

Embodiment 800 depicted in FIG. 8 also presents the nut-embedded dispenser 722 that may not be proximal to the element that may need lubrication. In the present embodiment 800, the compressor disc 145 may be replaced by the turbine 143 for illustrative purposes. Nonetheless, it should be understood that both embodiments (700 and 800) illustrate the possibility of the nut-embedded dispenser 722 to provide lubrication fluid through different elements that may separate the lubrication provider and the element to be lubricated. In the present embodiment, a distal end of the conduit C may be connected and/or sealed to the outlet 125 to then extend through the turbine 143 to reach the element that may be lubricated (be it the bearing 144). If necessary, it may be possible to include at least one element 230 that may be one of the restrictor/rupture disc/valve/porous media/nozzle/pressure compensated flow regulator, as previously described, in the outlet 125. Depending on the separation that may exist between the nut-embedded dispenser 722 and the bearing 144 the conduit C may extend past the periphery of the turbine 143. The opposite distal end of the conduit C may include at least one element 230 to control the direction of the lubrication fluid that may be expelled therethrough. As described with previous exemplary embodiments, it may be suitable to include the fill valve 124a and/or the relief valve 126 into the fill port 124 of the present embodiment 800.

As shown in exemplary embodiments 300, 400, 700, and 800, it may be possible to mount different elements between the dispenser (122, 522, 622, 722) and the element that needs lubrication. It may be possible to mount on the shaft 141 more than one turbine in combination with more than one compressor disc (or any other suitable element present in mechanical systems) wherein every element includes a conduit C that may be connected to the dispenser and maybe in communication with the element that may require lubrication. Additionally, it is to be understood that elements described herein as part of the mechanical system 140 correspond to a rotating configuration such as bearings, turbines, compressor discs. However, the mechanical system 140 may include elements that are suitable for both rotating and non-rotating configuration and that are not explicitly described herein, but that are well known in the art. Furthermore, a bearing is used herein as exemplary element that is to be lubricated, nonetheless, other elements in mechanical systems, as known in the art, that need lubrication may be suitable to be included herein.

Exemplary embodiments 900, 1000, and 1100 are better illustrated in FIGS. 9, 10 and 11, respectively. In the aforementioned embodiments, the features of the shaft 141 and the annular-shaped dispenser 122 may be combined to create a shaft capable of receiving, storing, metering, and expelling oil therefrom, hereinafter termed as shaft-embedded dispenser 922. The shaft-embedded dispenser 922 may include elements of the dispenser 122 such as the reservoir 123, the fill port 124 and the outlet 125. In the present embodiments, the reservoir 123 of the shaft-embedded dispenser 922 may extend axially along the interior thereof a predetermined length. In the present embodiments, the shaft-embedded dispenser 922 may include channels 930 disposed in an inner cross-section. The channels 930 may communicate the reservoir 123 with an exterior of the shaft-embedded dispenser 922. In embodiments 900 and 1100 the channels 930 may include an access port 932 that facilitates cleaning and manufacturing.

In exemplary embodiment 900, as shown in FIG. 9, the shaft-embedded dispenser 922 may include the bump-out 141a previously presented in embodiment 100. Mounted on the shaft-embedded dispenser 922 there may be the element that may require short term lubrication, such as the bearing 144, clamped against the bump-out 141a by means of the nut 142 threaded onto a distal end of the shaft-embedded dispenser 922. Therebetween the bearing 144 and the nut 142 there may be a spacer 146 to separate both elements. The fill port 124 may be located at the distal end that receives the nut 142. As aforementioned, the fill port 124 may have a fill valve 124a and/or a relief valve 126 operatively connected therewith. It may be possible that the fill port 124 may be an integral part of the nut 142 to allow refilling the reservoir without unclamping the rest of the elements. It may also be suitable that the fill port 124 may be an integral part of the shaft-embedded dispenser 922 and that the nut 142 may cover it. In the present embodiment, the channels 930 may be formed in the bump-out 141a and may follow a trajectory that permits to communicate the reservoir 123 with the part of the bearing 144 that may need lubrication (be it the inner race 144a). In the present embodiment, the channels 930 may be in right angle configuration, nonetheless, channels 930 may follow any other suitable trajectory as long as they form a passage that permits the oil to flow from the reservoir 123 to the element that may be lubricated. At distal ends the channels 930 may include at least one element 230 that may be one of the restrictor/rupture disc/valve/porous media/nozzle/pressure compensated flow regulator, as previously described. It may be suitable to use an integral flow restrictor as disclosed in U.S. application Ser. No. 17/750,534 in the present exemplary embodiment as element 230.

In exemplary embodiment 1000, as depicted in FIG. 10, the bearing 144 may include a channel 144b that extends radially from the inner race 144a towards the shaft-embedded dispenser 922. Additionally, in the present embodiment 1000 the outlet 125 may be flush with the channel 144b to feed oil to the bearing 144. At the outlet 125 the present exemplary embodiment 900 may include at least one element 230 that may be one of the restrictor/rupture disc/valve/porous media/nozzle/pressure compensated flow regulator, as previously described. In the present exemplary embodiment 900, the bearing 144 and the spacer 146 may be clamped by a variation of the nut-embedded dispenser 722 that may not exhibit the outlet pointing towards the element that may be fed as shown in FIG. 7-8. The present variation hereinafter termed as nut-embedded reservoir 722a may provide additional oil storage that may be used in concatenation with the shaft-embedded dispenser 922. The nut-embedded reservoir 722a, may present features of the nut 142 as are widely known in the art, such as the inner thread. The nut-embedded reservoir 722a may include the fill port 124 that permit to refill the nut's reservoir. In the present embodiment, it may be suitable to include an element to seal the reservoir nut's reservoir once oil has been introduced therein. In one embodiment, a plug may be screwed, welded, or the like, into the fill port 124 to seal it. In another embodiment a valve may be disposed within the fill port 124. The valve may be unidirectional or bidirectional depending on the application requirements.

Exemplary embodiment 1100 as illustrated in FIG. 11 may be a combination of exemplary embodiments 900 and 1000. As it can be seen, the present embodiment 1100 discloses the incorporation of the channels 930 disposed in the shaft-embedded dispenser 920 operatively connected to the channel 144b formed in the bearing 144. The nut-embedded reservoir 722a may also be included in the present embodiment. However, in both 1000 and 1100 the nut with reservoir 142a may be an optional implementation depending on the requirements of the application.

Exemplary embodiments 1200-1400 illustrated in FIGS. 12-13 represent different configurations in which the shaft-embedded dispenser 922 in conjunction with the nut-embedded dispenser 722 may be used to feed multiple bearings 144. One of the advantages of the present invention is its versatility to mount it into existing stacks without modifying its operating features. Thereby, given the various geometries of the oil dispenser 120 herein described, multiple components can be fed simultaneously.

Exemplary embodiment 1200 as shown in FIG. 12 depicts a shaft-embedded dispenser 922 having, for exemplary purposes, at least two bearings 144 mounted thereon, it should be understood that it may be possible to include more than two bearings 144 or other suitable components. A relief valve 126 may be radially disposed in the shaft-embedded dispenser 922 to prevent a vacuum from building inside the dispenser as the fluid is dispensed. Nonetheless, the location of the relief valve 126 may be case dependent. The present embodiment 1200 is a combination of the features described for the exemplary embodiment 1000 with a nut-embedded dispenser 722 fastened at a distal end of the shaft 922. In the present embodiment 1200 an o-ring seal O may be included between the threaded portions of both the nut and the shaft dispensers (722, 922) to prevent leakage. At least one element 230 previously described and the fill valve 124a can be implemented in this embodiment 1200 as shown. One bearing 144 may be fed through the alignment of both channels 930 and 144b. A second bearing 144 disposed proximal to a distal end of the shaft may be fed by the nut-embedded dispenser 722. It must be understood that the reservoir 123 may conform with the geometry of the dispenser that encloses it. In the present exemplary embodiment 1200 it can be seen that the reservoir 123 extends towards a distal end of the lateral wall of the nut-embedded dispenser 722 wherein the outlet 125 may be disposed and operatively connected to at least one element 230 that may be one of the restrictor/rupture disc/valve/porous media/nozzle/pressure compensated flow regulator, as previously described. To connect both the reservoirs of both dispensers (722, 922) the fill port 124 of the shaft dispenser 922 may be aligned with the fill port 124 of the nut dispenser 722 as shown along a center line of the shaft dispenser 922. It may also be suitable that there may be fill valves 124a therein.

Exemplary embodiment 1300 as shown in FIG. 13 illustrates a variation of the shaft-embedded dispenser 922 having more than one outlet 125 aligned with the channels 144b of the bearings 144 to feed oil thereto. Each outlet 125 may be operatively connected to at least one element 230 that may be one of the restrictor/rupture disc/valve/porous media/nozzle/pressure compensated flow regulator, as previously described. Additionally, it may be possible to include the relief valve 126 and the fill valve 124a within the reservoir to provide more flow control therein. As with embodiment 1200, the nut-embedded reservoir 722a may be fastened at the distal end of the shaft dispenser 922 and may include the o-ring seal O (or the like) to proven leakage. In this present exemplary embodiment 1300, the nut-embedded reservoir 722a may act as an additional storage element that is operatively connected to the reservoir 123 of the shaft-embedded dispenser 922. In the present embodiment 1300, it may be possible for the fill port 124 to be disposed in the nut-embedded reservoir 722a to insert a fluid into the shaft-embedded reservoir 922 by means of the inner connection of both reservoirs 123 as shown. Additionally, it may also be suitable for the whole system to include spacers 146 between elements. As described above, it also may be suitable for the nut-embedded reservoir 722a to include a relief valve 126 on the rear side thereof.

Exemplary embodiment 1400 as illustrated in FIG. 14 presents almost identical characteristics as embodiment 1300 but with the reservoir 123 divided in independent compartments that still act as reservoirs 123 but that may be volumetrically suitable to store a predetermined amount of oil that can be calculated experimentally depending on the requirements of element that may be fed on operating conditions. In the present embodiment 1400 it may be possible for each subsection of the reservoir 123 to include a fill port 124 operatively connected to the fill valve 124a to introduce oil therein. As normally shafts may be volumetrically larger, they may have more space to store fluids inside, the intention of the present embodiment 1400 is to show the possibility of including separated reservoirs inside the shaft-embedded dispenser 922 wherein each may include a fill port 124 and an outlet 125 to provide independent short-term lubrication means within one component. The present embodiment shows a broken section at the left side thereof, this is intended to convey that the shaft-embedded dispenser 922 may extend longitudinally, and, as the reservoir may conform with the shape of the element enclosing it, the reservoir may extend to the left a predetermined distance as well.

In another exemplary embodiment 1500 as illustrated in FIGS. 15-15a, the annular-shaped dispenser 122 may have rotating fans/fins 150 disposed on an exterior surface thereof hereinafter termed as finned dispenser 1522 for the purposes of moving air and acting as a heat sink to cool the system, elements 150 may also be used to increase surface area to draw heat away. The fans/fins 150 may be designed to move air to cool surrounding areas and/or distribute air more evenly throughout the bearing compartment/inner race. As it may be suitable to provide short term lubrication to components such as bearings 144 to extend their lifespan. It may also be beneficial to provide short term lubrication means with cooling means which is the intention of finned dispenser 1522. Cooling is helpful for maintaining a thermal equilibrium of the bearings 144, preventing a thermal runaway event which would damage the hardware and lead to failure. It may be helpful when small amounts of oil are being fed to the bearings 144, resulting in less oil to carry away heat. The fans/fins 150 may be elements that extend outwardly from the external surface of the finned dispenser 1522 as shown in FIG. 15a, the fans/fins 150 may be disposed horizontally or vertically depending on the geometry thereof and may be disposed in a circular arrangement about the periphery of the finned dispenser 1522. When rotating, the fans/fins 150 provide passive convective cooling to the bearing 144 to control temperature and convect heat away from hot zones at contact regions. In the present embodiment 1500 the finned dispenser 1522 may inherit the features of the annular-shaped dispenser 122 such as the outlet 125 and the fill port 124 as described previously. For the fluid to reach the inner race 144a, the present invention in exemplary embodiment 1500 may include the conduit C disposed in the inner-cross section of the elements of the mechanical system 140, be it the spacer 146 for exemplary purposes, to then be operatively connected to the channel 144b of the bearing 144 that leads to the inner race 144a thereof. It may also be suitable that at least one element 230, as previously described, may be disposed at a distal end of the channel 144b as shown. It may be suitable to use an integral flow restrictor as disclosed in U.S. application Ser. No. 17/750,534 in the present exemplary embodiment as element 230.

Exemplary embodiment 1600 as shown in FIG. 16 is intended to present a configuration is which the parts of the mechanical system 140 such as the shaft 141, the spacer 146, the turbine 143, the nut 142 and those that are known in the art, in conjunction with the annular-shaped dispenser 122 are all or partially monolithic and made using additive manufacturing, or the like. This configuration 1600 may include the features previously described such as independent reservoirs in the shaft, the nut, the turbine. It may also present the conduits and the filling/expelling features with elements such as the fill valve 124a and at least one element 230 that may be one of the restrictor/rupture disc/valve/porous media/nozzle/pressure compensated flow regulator, as previously described. It may be suitable to use an integral flow restrictor as disclosed in U.S. application Ser. No. 17/750, 534 in the present exemplary embodiment as element 230.

It may be suitable to include the relief valve 126 in all the aforementioned embodiments if the operating conditions to which the present invention will be subject require it. Additionally, it may be possible that the relief valve 126 may be exposed to the surroundings, nonetheless, in embodiments wherein the relief valve 126 may be obstructed by any element of the mechanical system, it may be possible for it to include a relief conduit RC that may be aligned and operatively connected to the relief valve 126 wherein one end of the relief conduit RC may be exposed to permit interaction between the relief valve 126 and the surroundings. Embodiments 200A, 200B, 1200, 1300 are meant to show different settings of the relief valve 126 but it may be applied to every embodiment herein described if required. The relief valve 126 may be separated from the fill valve 124a or may be combined with it.

Oil/lubrication fluid may be entered into the fill port 124 in the various exemplary embodiments herein described to then be expelled through the outlet 125 due to centrifugal forces exerted upon the oil/lubrication fluid as a consequence of the rotation of the mechanical system 40.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. An annular oil dispenser, comprising:
    an annular-shaped body has a thickness and a concentric annular-shaped reservoir is located within said thickness that concentrically extends within said the annular-shaped body, said annular-shaped reservoir adapted to being able to receive and store a fluid, said annular-shaped body has a central void;
    said annular-shaped body has a fill port comprising an internal channel extending through a cross-section of the body from the reservoir to an outer surface of the body; and
    said annular-shaped body has an outlet comprising an internal channel extending through the cross-section of the body from the reservoir to the outer surface.

2. The annular oil dispenser set forth in claim 1, wherein at least one element from a group consisting of: a valve, a porous media element, a nozzle, a restrictor, a rupture disc, or a pressure compensated flow regulator is attached inside the outlet.

3. The annular oil dispenser of claim 1, wherein said annular-shaped body is coupled to a shaft, wherein said shaft is inserted into said central void such as an outer surface of the shaft is in abutting contact with an inner surface of the void.

4. The annular oil dispenser of claim 3, further comprising a bearing mounted on the outer surface of said shaft, wherein the annular-shaped body is configured to be mounted on the shaft such that an inner circumferential surface of the annular-shaped body and an inner circumferential surface of the bearing are in abutting contact with an outer surface of the shaft.

5. The annular oil dispenser of claim 4 further includes a conduit having a first end in fluid communication with the outlet and a second end terminating adjacent to a channel of the bearing.

6. The annular oil dispenser set forth in claim 5, wherein at least one element of a group consisting of: a valve, a porous media, a nozzle, a restrictor, a rupture disc, or a pressure compensated flow regulator, connected to the second end of the conduit.

7. The annular oil dispenser set forth in claim 6, wherein the conduit extends along a longitudinal axis of the shaft from the outlet of the annular-shaped body towards the bearing, wherein the conduit is positioned substantially parallel to the length of the shaft.

8. The annular oil dispenser of claim 1, wherein a valve is connected within the fill port to allow in a gas external to the dispenser, thereby preventing a vacuum from building inside the annular oil dispenser as oil is dispensed.

9. The annular oil dispenser set forth in claim 1, wherein said central void has a threaded surface.

10. The annular oil dispenser as set forth in claim 1, wherein the annular-shaped body comprises an opening on a lateral outer wall thereof, said opening being concentric with respect to the central void, thereby defining a wrench feature for tightening and loosening the annular oil dispenser.

11. The annular oil dispenser, as set forth in claim 1, wherein the fill port and outlet are placed within a remaining thickness between a periphery of the annular-shaped body and said reservoir.

12. An annular-shaped oil dispenser having a central void through which a shaft is received, comprising:
    an outer circumferential surface;
    an inner circumferential surface concentrically disposed within the outer circumferential surface to define a central void along an axis of symmetry;
    an annular-shaped reservoir defined within a cross-sectional area between the outer circumferential surface and the inner circumferential surface, wherein said reservoir is enclosed by lateral walls;
    a fill port comprising an internal channel extending through a cross-section of the body from the reservoir to an outer surface of the annular-shaped oil dispenser, wherein a valve is connected within the fill port to allow in a gas external to the dispenser, thereby preventing a vacuum from building inside the annular-shaped oil dispenser as oil is dispensed;
    an outlet for dispensing oil from the reservoir, the outlet comprising an internal channel extending through the cross-section of the body from the reservoir to the outer surface of the annular-shaped oil dispenser, wherein at least one element from a group consisting of: a valve, a porous media element, a nozzle, a restrictor, a rupture disc, or a pressure compensated flow regulator is attached inside the outlet;
    a bearing mounted on the shaft, the bearing having a central void;
    wherein when the annular-shaped oil dispenser is mounted on the shaft said inner circumferential surface is in direct contact with an outer surface of the shaft, the central void of the oil dispenser is coaxially aligned with the central void of the bearing to allow lubricating oil dispensed from the outlet to flow into a channel of the bearing.

* * * * *